United States Patent [19]

Ogata et al.

[11] Patent Number: 5,503,745
[45] Date of Patent: Apr. 2, 1996

[54] FILTERING MEDIUM AND A PROCESS FOR PRODUCING THE SAME

[75] Inventors: Satoshi Ogata, Moriyama; Kazue Nishio, Shiga, both of Japan

[73] Assignee: Chisso Corporation, Osaka, Japan

[21] Appl. No.: 249,866

[22] Filed: May 26, 1994

[30] Foreign Application Priority Data

May 26, 1993 [JP] Japan .................................. 5-146957

[51] Int. Cl.$^6$ .................................................. B01D 39/16
[52] U.S. Cl. ........................... 210/490; 210/504; 210/505; 210/508; 264/234
[58] Field of Search ................................. 210/503, 504, 210/505, 508, 490; 428/288; 264/209.3, 23, 25, 171, 234

[56] References Cited

U.S. PATENT DOCUMENTS

| | | | |
|---|---|---|---|
| 4,657,804 | 4/1987 | Mays et al. | 428/212 |
| 4,722,857 | 2/1988 | Tomioka et al. | |
| 5,225,014 | 7/1993 | Ogata et al. | 156/73.2 |
| 5,302,447 | 4/1994 | Ogata et al. | 428/288 |

FOREIGN PATENT DOCUMENTS

| | | |
|---|---|---|
| 1-194912 | 8/1989 | Japan . |
| 4-126508 | 4/1992 | Japan . |
| 4-346805 | 12/1992 | Japan . |
| 5-49462 | 7/1993 | Japan . |
| 5-230750 | 9/1993 | Japan . |
| 5-285312 | 11/1993 | Japan . |

*Primary Examiner*—Frank Spear
*Attorney, Agent, or Firm*—Fay, Sharpe, Beall, Fagan, Minnich & McKee

[57] ABSTRACT

A filtering medium which is unchanged in the maximum pore size even when heating sterilization, high temperature filtration, etc. are carried out, yet has a high tensile strength, can be processed into pleat-form and also is applied to high precision filtration, is provided, which filtering medium is a product having a non-woven fabric composed of 20 to 80% by weight of lower melting point microfine fibers and 80 to 20% by weight of higher melting point microfine fibers having a melting point higher by 10° C. or higher than that of the lower melting point microfine fibers, the respective fibers being hot-melt-adhered to one another through the lower melting point microfine fibers, hot-melt-adhered to a hot-melt-adhesive net, and having a maximum pore size of 120 μm.

9 Claims, No Drawings

FILTERING MEDIUM AND A PROCESS FOR PRODUCING THE SAME

BACKGROUND OF THE INVENTION

1. Field of the Invention

This invention relates to a filtering medium used for precision filtration such as a filter for liquid used for washing electronic devices or a prefilter for liquid or gas used for producing medicines. More particularly, it relates to a filtering medium for precision filtration, obtained by hot-melt-adhering a non-woven fabric composed of microfine fibers having the intersections thereof hot-melt-adhered, to a net made of hot-melt adhesive fibers, which medium has no change in the pore diameter due to heating and a superior processability for pleat form, etc., and a process for producing the above filtering medium.

2. Description of the Related Art

In recent years, industries directed to electronics, biochemicals, etc. have been developed, and an opportunity using a purified gas or liquid for producing these materials have been increasing. Heretofore, as a filtering medium for a precision filtration, glass fiber non-woven fabrics, synthetic fiber non-woven fabrics composing of microfine fibers, etc. have been used. However, the above glass fiber non-woven fabrics have such problems that the fabrics are weak to alkali-resistance, and when they are processed into a pleat form in order to afford a large surface area for filtration or processed into various steric shapes, they are inferior in the so-called shapability, and so on. On the other hand, the above synthetic fiber non-woven fabrics have such advantages that they have a less specific gravity and a lighter weight as compared with glass fiber non-woven fabrics; the shapability is better than that of glass fiber non-woven fabrics; they are cheaper; the material does not scatter away at the time of processing the filtering medium as in the case of glass fibers so that they are easily dealt with; and so on. Thus, the filtering medium of the synthetic fiber non-woven fabrics has rapidly come to be used broadly.

For the filtering medium of synthetic non-woven fabrics, polyester spun bonded non-woven fabrics, polypropylene melt-blown non-woven fabrics, etc. have been used, but there is a problem that mesh-openings of the non-woven fabric enlarge due to heating, vibration, abrasion, etc. to make the pore size larger, thus the stability of the pore size is inferior.

As a material having improved the shapability of the filtering medium of non-woven fabric, a filtering medium obtained by hot-melt-adhering a non-woven fabric onto a net-form sheet has been known. Japanese patent application laid-open No. Hei 1-194912 discloses a filter obtained by hot-melt-adhering a microfine fiber non-woven fabric brought into an electret, onto a net-form material, and Japanese patent application laid-open No. Hei 4-346805 discloses a filtering medium obtained by hot-melt-adhering a microfine fiber non-woven fabric onto a net composed of hot-melt-adhesive filaments and metal-gage wires.

In the case of any of the above products obtained by hot-melt-adhering a non-woven fabric onto a net-form sheet, regular fibers such as those of melt-blown polypropylene, melt-blown polyesters, etc. have been used. That is, a product obtained by hot-melt-adhering the microfine fiber web so that the intersections of the fibers have not been hot-melt-adhered, a product obtained by hot-melt-adhering the microfine fiber web so that the intersections of the fibers have been partly hot-melt-adhered by means of emboss roll, calender roll or the like, a product obtained by laminating a net onto a web or a hot-press-adhered non-woven fabric, followed by hot-melt-adhering the non-woven fabric onto a net by means of a heating means such as calender roll, dryer or the like.

However, when the hot-melt-adhesion of the non-woven fabric is observed from the micro-view point, it is difficult for the above filtering medium of non-woven fabrics to sufficiently hot-melt-adhered through the intersections of the fibers without damaging the air permeation resistance of the medium. For example, in the case of emboss roll, parts other than hot-pressed parts have not been hot-melt-adhered. In the case of calender roll, the upper and under surfaces of the non-woven fabric have been mostly hot-melt-adhered, but the hot-melt-adhered parts are few at the central parts in the direction of the thickness, or even if there are many hot-melt-adhered parts, such parts are liable to be weak. In the case of such non-woven fabrics having different hot-melt-adhesion states of fibers as described above, mesh-openings in the non-woven fabric are liable to be enlarged on account of heating at the time of processing the woven fabric into pleat weave or into a cylindrical form, heat-sealing both the end surfaces of a cylinder with an end surface member of a synthetic resin, or heating a filtering medium for heat-sterilization, or on account of vibration, impulse, vibration of housing at the time of filtration, etc. Thus, there is a drawback that the maximum pore size of the non-woven fabric becomes larger, that is, a drawback that the pore size stability is inferior. In particular, a product having a basis weight as high as about 25 g/m$^2$ or more is liable to be insufficient in the hot-melt-adhesion of fibers in the vicinity of the intermediate part in the thickness direction, of non-woven fabric, and is inferior in the pore size stability, and often had a maximum pore size after heated, increased as large as by 25% or more.

Further, the filtering medium obtained by hot-melt-adhesion at a high temperature and under a high pressure according to calender roll process or the like is somewhat improved in the pore size stability, but since the whole of the fibers is melted and changed into a film form, there is raised a problem that the air permeation resistance becomes notably high.

SUMMARY OF THE INVENTION

The object of the present invention is to provide a filtering medium which does not cause the change in the maximum pore size thereof due to heating, vibration, etc., raised in the prior art, and has a high tenacity and also can be easily processed into a preat form or other complicated shapes.

The present inventors have made extensive research in order to solve the above problems and as a result, have found that the object can be achieved by the following aspects (1) to (6) of the present invention:

(1) A filtering medium having (i) a non-woven fabric composed of a mixture of 20 to 80% by weight of lower melting point microfine fibers and 80 to 20% by weight of higher melting point microfine fibers having a melting point higher by 10° C. or higher than that of said lower melting point microfine fibers, said higher melting point microfine fibers and said lower melting point microfine fibers having been hot-melt-adhered to one another by melt-adhesion of said lower melting point microfine fibers, hot-melt-adhered onto (ii) a hot-melt-adhesive net, the maximum pore size of the resulting filtering medium being 120 μm or less.

(2) A filtering medium according to item (1), wherein
said lower melting point microfine fibers have a fiber diameter of 10 μm or less and are composed of single component fibers or components of conjugated fibers;
said higher melting point microfine fibers have a fiber diameter of 10 m or less and are composed of single component fibers or components of conjugated fibers;
said hot-melt-adhesive net is composed of hot-melt adhesive fibers having a fineness of 30 to 4,000 deniers and is obtained by knitting or weaving conjugated fibers composed of said lower melting point component and said higher melting point component;
the lower melting point component of said conjugate fibers of the hot-melt-adhesive net and the component of said lower melting point microfine fibers belong to the same kind, and
the percentage of change in the maximum pore size after hot-treating is 20% or less.

(3) A filtering medium according to either one of items (1) and (2), subjected to pleat processing.

(4) A filtering medium according to any one of items (1) to (3), made into an electret, and having a degree of air permeation of 0.1 to 100 cc/cm$^2$.second, and a tensile strength of 2 to 100 Kg/5 cm.

(5) A process for producing a filtering medium, which comprises spinning a plurality of resins through a spinneret to obtain a web composed of 20 to 80% by weight of lower melting point microfine fibers and 80 to 20% by weight of higher melting point microfine fibers having a melting point higher by 10° C. or higher, than that of said lower melting point microfine fibers, heat-treating said web to obtain a non-woven fabric having fibers hot-melt-adhered to one another by said lower melting point microfine fibers,
spinning, in a separate step, a resin through a spinneret to obtain fibers, followed by knitting or weaving the fibers to obtain a hot-melt-adhesive net, and then
laminating said non-woven fabric onto said hot-melt-adhesive net, and heat-treating the resulting laminate to obtain a filtering medium having a maximum pore size of 120 μm or less.

(6) A process for producing a filtering medium according to item (5), wherein said non-woven fabric is obtained by heat-treating a microfine fiber web obtained by spinning according to melt-blow process.

DETAILED DESCRIPTION OF PREFERRED EMBODIMENTS

The filtering medium of the present invention is a product obtained hot-melt-adhering a non-woven fabric composed of hot-melt-adhered microfine fibers onto a net, and the resulting hot-melt-adhered filtering medium has a maximum pore size of 120 μm or less; the non-woven fabric is composed of 20 to 80% by weight of the lower melting point microfine fibers and 80 to 20% by weight of higher melting point microfine fibers, and these microfine fibers are adhered to one another by hot-melt-adhesion of the lower melting point microfine fibers; and the difference between the melting points of the lower melting point microfine fibers and the higher melting point microfine fibers is 10° C. or higher.

The process for producing the filtering medium of the present invention includes the following steps. Two or more kinds of thermoplastic resins having a melting point difference of 10° C. or higher are spun through a spinneret according to various processes, and the resulting fibers are mixed to form a web. The web is heated up to the hot-melt-adhesion temperature or higher of the lower melting point microfine fibers, to hot-melt-adhere these microfine fibers at the intersections thereof to prepare a non-woven fabric.

A resin is spun through a spinneret to obtain fibers, followed by knitting or weaving the fibers to obtain a net, laminating the above non-woven fabric onto the net, and heat-treating and hot-melt-adhering the laminate to produce a filtering medium having a maximum pore size of 120 μm or less.

The spinning process of the microfine fibers may be carried out by extruding the lower melting component and the higher melting component separately by using two or more spinnerets for these different components, which is so-called single components-combined spinning process, or by introducing two or more conjugate components into one spinneret and extruding these components as a conjugate fiber through each one hole of the spinneret to form conjugate fibers.

Further, the spinning process may be the one wherein the first spinneret is used for conjugate spinning and the second spinneret is two kinds of spinnerets for spinning single components, or the one wherein both of the first spinneret and the second spinneret are two kinds of spinnerets for conjugate spinning, or the one wherein one spinneret contains conjugate spinning parts and single component-spinning parts, i.e. the so-called single component/conjugate components mixed spinning.

The process for spinning microfine fibers include melt-blow process, spun bonded process, flash spinning process, stretching spinning process, etc. and further conjugate spinning process, and mixed spinning process each thereof. Among these processes, mixed spinning process according to melt-blow process is particularly preferred since fibers are well blended. Further, a spinneret wherein the component-introducing grooves of the spinneret can be changed for the respective components, is preferred since the proportions of the respective components (lower melting component and higher melting component) can be changed. As the conjugate spinneret, various spinnerets such as those of side-by-side type, sheath and core type, multi-divisional type, island-in-sea type, etc. can be used. Further, a process of once spinning two kinds of microfine fibers through separate spinnerets, to form two webs, followed by laminating the resulting webs, and then mixed by means of needle punching, water-needle, etc., to obtain a non-woven fabric used in the present invention.

In the present invention, since its use applications are directed to a filtering medium for precision filtration, it is preferred to use microfine fibers having a diameter of 20 μm or less, preferably 0.1 to 10 μm, more preferably 0.2 to 8 μm. Further, the non-woven fabric used for the filtering medium of the present invention is composed mainly of the above microfine fibers, but fibers having a fiber diameter of 20 μm or more may be blended within a range wherein the object of the present invention is not damaged.

The microfine fibers used in the present invention are a mixture of lower melting microfine fibers with higher melting point microfine fibers. This mixture means blended fibers of lower melting point microfine fibers (single component) with higher melting point micorfine fibers (single component), those of lower melting point microfine fibers (single component) with higher melting point microfine fibers (conjugate component), those of lower melting point microfine fibers (conjugate component) with higher melting point microfine fibers (single component), or those of lower melting point microfine fibers (conjugate component) with higher melting point microfine fibers (conjugate component). In this application, the melting point of the conjugate component fibers is defined as the melting point of the lower melting point component since the lower melting component is hot-melt-adhered. Further, as the conjugate fibers, those having combined components having no melting point difference, but having different molecular weights and crystallinities may be used.

Thermoplastic resins usable for as the raw materials of the microfine fibers include resins such as polypropylene, polyethylene, poly-4-methylpentene, bipolymer or terpolymer of propylene with other α-olefins, polyethylene terephthalate, polyamides, polycarbonates, etc. The melting point difference between the melting point of lower melting point microfine fibers and that of higher melting point microfine fibers is 10° C. or higher, preferably 15° to 150° C., more preferably 20° to 100° C. Combined spinning or the like is carried out by using various combinations of these resins having the above preferable melting point difference.

Examples of combinations of resins for the mixed fibers of lower melting point microfine fibers (single component) with higher melting point microfine fibers (single component) are polyethylene: polypropylene, propylene-ethylene-butene-1 terpolymer: polypropylene, polypropylene: polyethylene terephthalate, low melting polyester: polyethylene terephthalate, polyamide: polyethylene terephthalate, etc.

In the case of mixed fibers of lower melting point microfine fibers (single component) with higher melting point microfine fibers (conjugate component), a linear, low density polyethylene is exemplified as the lower melting point microfine fibers, and polypropylene (sheath)/polyamide (core) is exemplified as the higher melting point microfine fibiers (conjugate component). In the case of mixed fibers of lower melting point microfine fibers (conjugate component) with higher melting point microfine fibers (single component), linear low density polyethylene/polypropylene, (side by side) is exemplified as the lower melting point microfine fibers, and polyethylene terephthalate is exemplified as higher melting point microfine fibers (single component).

In the case of mixed fibers of lower melting point microfine fibers (conjugate component) with higher melting point microfine fibers (conjugate component); linear low density polyethylene/polypropylene, (side by side) is exemplified as the lower melting point microfine fibers (conjugate component), and polypropylene/polyethylene terephthalate, (side by side) is exemplified as the higher melting point microfine fibers (conjugate component), and high density polyethylene (sheath)/polyethylene terephthalate (core) is exemplified as the lower melting point microfine fibers (conjugate component), and polypropylene (sheath)/polyethylene terephthalate (core) is exemplified as the higher melting point microfine fibers (conjugate component).

Two kinds of microfine fibers having different melting points are spun according to melt-blow process or the like, and the resulting two kinds of webs are heated up to the melting point or higher of the lower melting point component of the microfine fibers to obtain a non-woven fabric having the intersections of the fibers hot-melt-adhered.

In the present invention, in the case where the content of the lower melting point microfine fibers is lower than 20% by weight, even if the webs are subjected to the heat treatment described below, the hot-melt-adhered points of the fibers are few and hence a product having a good stability of the pore size cannot be obtained, and yet there are problems of fluffing, insufficient tenacity, etc. On the other hand, in the case where the content of the lower melting point microfine fibers exceeds 80% by weight, when the heat treatment described below is carried out such problems are raised that the lower melting point microfine fibers are completely melted to lose the fiber shape, conversion into film, shrinkage of fibers into beads occur, and resistance to air permeation increases, to give a product having an inferior filtration accuracy.

The heat treatment is carried out using a heating means such as dry heat-circulating type dryer, through-hair type dryer, calender roll, emboss roll, etc. Among such heating means, in the case where heat treatment is carried out using a means such as through-air calender, capable of hot-melt-adhering in a state where pressure is not so much applied onto a non-woven fabric, the resulting non-woven fabric has a high air permeation degree. Further, in the case where hot-melt-adhesion is carried out using a hot-press adhesion type means, a non-woven fabric having a small maximum pore size is obtained.

The above-mentioned treatment is applicable to hot-melt-adhesion of the non-woven fabric onto the net.

The non-woven fabric used in the filtering medium of the present invention includes hot-melt-adhesive lower melting point microfine fibers which are melted by the heat treatment, and the intersections of the fibers have been hot-melt-adhered. Thus, when the heat treatment is carried out a temperature higher than the softening-temperature of the lower melting point fibers and lower than the melting point of the higher melting fibers, then the higher melting point fibers are not melted to retain the shape of fibers, and the intersections of fibers are hot-melt-adhered by the lower melting point fibers to form a stable non-woven fabric. Thus, mesh-openings of the filtering medium will not enlarged by sterilization treatment, high temperature filtration, vibration, etc. at the subsequent steps, to afford a product having a stabilized pore size. Further, a kind of film-making due to complete melting of fibers does not occur, and if any, the film-making is very few. Accordingly, a product having a large air permeation degree and yet a small pore size is obtained.

Whereas, in the case of non-woven fabrics made from 100% of single component microfine fibers obtained according to conventional melt-blow process not hot-melt-adhered fibers are found in a large quantity in the vicinity of the central portion in the direction of the thickness of the fabrics and the bond of the hot-melt-adhered part in the vicinity of the central portion is so weak that when the fabric obtained by hot-melt-adhering the non-woven fabrics onto a net mentioned below is subjected to heat-sterilizing treatment, high temperature filtration or undergoes vibration, the mesh openings of the fabric will be enlarged. Further, in the case of the material obtained by heating such non-woven fabric at high temperatures by means of calender roll or the like, the fibers are completely melted to lose the fiber shape and result in a film form. In the case of a material obtained by heating such non-woven fabric at high temperatures by means of a through-air type heater, the fibers melt and shrink to agglomerate into beads form. Such a material has a small degree of permeation and a large maximum pore size.

As to the non-woven fabric used for the filtering medium, those having a basis weight of about 3 to 1,000 $g/m^2$, preferably 4 to 700 $g/m^2$, are usable. Further, as to the non-woven fabric, by varying the basis weight, and processing conditions such as heating temperature, linear pressure of calender roll, treating time, etc., it is possible to vary the pore size (diameter) of the non-woven fabric. When the material is produced under conditions of smaller fineness of fibers, larger basis weight and higher linear pressure of calender roll, the resulting non-woven fabric has a smaller pore size.

The filtering medium of the present invention is a product having the above non-woven fabric hot-melt-adhered onto a net, and the net is a material obtained by knitting or weaving fibers containing a thermoplastic resin.

The fibers for the net are sufficient to be those containing at least 30% by weight of thermoplastic fibers and are those which become hot-melt-adhesive by heat treatment. Examples of such fibers are multifilament, monofilament, spun yarn, etc. The fibers may be single component fibers, conjugate fibers, mixed fibers or mixture of thermoplastic fibers with cotton. In particular, conjugate fibers obtained by subjecting at least two kinds of thermoplastic resins having a melting point difference of 10° C. or higher to conjugate spinning process are preferred.

As a net product, a product obtained by knitting or weaving hot-melt-adhesive conjugate monofilaments into a net form, a product obtained by heating the net to a hot-melt-adhesion temperature or higher and hot-melt-adhering the intersections of the fibers, etc. are used. The conjugate components used for the hot-melt-adhesive net have a difference of melting points of 10° C. or higher, preferably 15° to 150° C., more preferably 20° to 100° C. Further, as the net, a product obtained by weaving fibers for the net having the total fineness of about 30 to 4,000 deniers in a weaving density of about 0.5 to 25 ends/25 mm is preferred.

As to resins for conjugate form of the fibers for the net, resins usable for the fibers for the net, a combination of the resins, etc. an appropriate combination of resins which can be hot-melt-adhered to the above non-woven fabric, may be chosen. In particular, when the temperature difference between the melting point of the lower melting resin of microfine fibers and that of the lower melting resin contained in the net is 15° C. or lower, there is formed a structure wherein the respective lower melting resins are intruded into one another at the intersection parts of the fibers by means of heat treatment; hence this is preferable in that the non-woven fabric is strongly hot-melt-adhered onto the net and the resins are hardly peeled off at the boundary surface thereof. In particular, a product is preferred wherein the resin of the lower melting point microfine fibers and the lower melting resin of the net belong to the same kind, such as polyolefin/polyolefin, polyester/polyester, etc.

The above non-woven fabric is laminated as in the order of non-woven fabric/net, net/non-woven fabric/net, etc. or the resulting layers is further laminated at two stages, and such layers are hot-melt-adhered to prepare a filtering medium. The process may also be carried out by roll treating after heated or by hot-melt-adhering by means of a heating roll. Of course, a spun bonded non-woven fabric, a hot-melt-adhesive non-woven fabric of staple fibers, or the like, having a relatively large fineness, may be laminated onto the above layers.

Although the filtering medium may be fixed as it is onto a housing or a support, it may be formed into an optional shape such as a pleat form, an acute wave form, U-form, projections and depressions form, etc. by means of pleat-forming machine, molding machine, etc., and then be fixed onto a housing, to be used. Further, the filtering medium after shaped into various forms can be further fabricated into a cylindrical form, an ebb form, etc. In the case where the medium has been fabricated into a cylindrical form, the end parts thereof may be adhered by means of hot-melt-adhesion, a binder, etc.

As the housing, materials having various shapes are usable, depending upon its use applications for filtration. Examples thereof are a cylindrical core material having a large number of openings on its lateral surface, a porous, cylindrical outer frame material, a cylindrical housing having end-sealing members, a housing of tetragonal frame form, a tetragonal housing composed of a metal net or the like, a box-type housing wherein the filtering medium is piled in a multi-layer form, or a housing of an optional form which can be fitted to a place for filtration.

Further, the filtering medium may be a product made into an electret. Examples are a process of making an electret between a 2spinneret and the collecting surface of fibers at the time of spinning and collecting fibers, an electret-making process during taking up a web or the like after spinning, and besides, processes of making into an electret, non-woven fabric, a product having a non-woven fabric hot-melt-adhered onto a hot-melt-adhesive net, a pleat-form filtering medium, a filtering medium fitted onto a housing, etc. For the electret-making treatment is carried out by a direct current corona discharge of about 1 to 30K volts. Further, the treated non-woven fabric or the like is preferred to have a surface charge density of about 10 to 45 coulombs/cm$^2$.

As to the filtering medium of the present invention, the microfine fibers of a fiber diameter of 10 μm or less may have a density gradient. Further, the filtering medium of the present invention may be a product obtained by further laminating other non-woven fabrics, sheets or the like having different fiber stocks, fiber diameters, etc. Examples of such other non-woven fabrics are a non-woven fabric having a fiber diameter of about 50 μm or less, prepared according to conjugate melt-blow process, a hot-melt-adhesive conjugate fiber non-woven fabric having a fiber diameter of 100 μm or less, a laminated sheet of the non-woven fabric onto a hot-melt-adhesive net.

(EXAMPLE)

The present invention will be described in more detail by way of Examples and Comparative examples. In addition, in these examples, the evaluations of the physical properties, filtrability, etc. of the filtering medium were carried out according to the following methods:

Fiber diameter of non-woven fabric and the like:

Ten small pieces were cut off from a web, a non-woven fabric or a filtering medium, followed by taking a photograph of a magnification of 100 to 5,000 times by means of a scanning-type electronic microscope and measuring the fiber diameters of 100 ends, to make the average value (μm) the fiber diameter of the non-woven fabric and the like.

Tensile strength:

The breaking strength (Kg/5 cm) of 5 cm width was sought by means of a tensile strength tester.

Degree of air permeation:

Degree of air permeation was sought according to a method defined by JIS-L1006A, by means of fragile type air permeation tester (Unit: cc/cm$^2$.sec)

Maximum pore size:

The maximum pore size (μm) was sought according to the method defined in ASTM-F-316-86 by means of bubble point tester.

Percentage of change in the maximum pore size after heated:

The maximum pore size before heating (A) and the maximum pore size after heated at 80° C. for 10 minutes (F) were sought according to the same method as the above, by means of the same bubble point tester, followed by calculating the percentage according to the following equation:

percentage of change in the maximum pore size after heated (%):

100 (F–A)/A

Filtration accuracy:

A circulating type filtration tester composed of a water vessel containing 50 l of water, provided with a pump, a housing for a filtration medium and a filtration device was used. One filtering medium was fixed to the housing of the filtration device, followed by adding 5 g of a cake (carborandom #4,000) into the water vessel, while circulating water in a quantity of 30 l/min., filtering filtrated water (100 cc) collected one minute after the cake addition by means of a membrane filter, and measuring the size of particles collected on the membrane filter by means of a machine for measuring the distribution of the particle size, to make the largest pore size (the maximum flown-out diameter, unit: μm), the filtration accuracy of the filtering medium.

Pressure loss:

In the above circulating type filtration accuracy test, no cake is added, but only water is curculated in a flow quantity of 30 l/min. The pressure loss (Kg/cm$^2$) was sought one minute after the circulation start.

Examples 1–3 and Comparative Examples 1–3

Mixed fiber spinning was carried out by means of a mixed fiber type melt-blow device composed mainly of two extruders and a melt-blow spinneret having a nozzle diameter of 0.3 mm and number of nozzles 501. The spinneret was constructed so that two kinds of molten resins extruded from two extruders could not be mixed in the respective holes, but extruded from each hole, and yet the respective holes from which the two kinds of the molten resins extruded could be varied in various hole number ratios.

A linear, low density polyethylene having a melt flow rate of 120 (MFR, g/10 min., 190° C.) and a melting point of 121° C. as a first component, and a polypropylene having a melt flow rate of 120 (MFR, g/10 min., 230° C.) and a melting point of 164° C. as a second component, were melt-extruded and subjected to melt-blow spinning. As to the spinning conditions, the spinning temperature of the first component was kept at 260° C. and that of the second component was kept at 280° C., and the components were extruded while varying the hole number ratio from which the two kinds of the components were extruded. The fibers extruded from the spinning nozzles were blown onto a conveyer net provided with a spouted air-sucking device, while introducing air at 360° C. under a pressure of 1.2 Kg/cm$^2$G. The fiber diameter of the resulting, microfine fibers was about 3 μm. The resulting web was heated at 135° C. for 15 seconds, by means of a through-air type heater. A non-woven fabric having the intersections of the fiber hot-melt-adhered and having a basis weight of about 100 g/m$^2$ was obtained.

A hot-melt-adhesive conjugate monofilament composed of a sheath component consisting of a linear, low density polyethylene having an MFR 18 (g/10 min., 190° C.) and a melting point of 124° C., and a core component consisting of a polypropylene having an MFR 8 (g/10 min., 230° C.) and a melting point of 164° C., and in a conjugate ratio of 50/50 (ratio by weight) and having a fineness of 250 d/f was woven into a plain weave in a weave density of 17 warps×17 wefts/25 mm, followed by heating the resulting net at 135° C. by means of a tenter type heater, to obtain a net hot-melt-adhered at the intersections of fibers.

The resulting material was laminated so as to give three layers in the order of net/non-woven fabric/net, followed by heating at 140° C. for 15 seconds by means of a through-air type heater and just thereafter treating by means of a calender roll at 30° C., to obtain a filtering medium having the non-woven-fabric hot-melt-adhered onto the net.

The filtering medium was pleat-formed by means a pleat-processing machine to obtain a filtering medium having a pleat height of 20 mm and a pleat form of W-form.

The pleat-formed filtering medium was wound up onto a hollow metal core having a large number of holes on its lateral side and having an outer diameter of 30 mm and a height of 250 mm, to obtain a filtering medium having an inner diameter of 30 mm and an outer diameter of 70 mm, hot-melting the both end parts of the medium, further adhering a metal end surface-sealing member having an opening part of a diameter of 30 mm at both the both end parts with a binder, to obtain a cylindrical filtering medium. This medium had a surface area having increased up to about 9.1 times, as compared with that of a product having an outer diameter of 70 mm, and no pleat shape. Table 1 shows physical properties of the filtering medium before and after heating, filtrability of filtering medium pleat formed and processed into a hollow and cylindrical form, etc.

As seen from Table 1, the filtering media of the present invention (Examples 1 to 3) have a percentage of change in the maximum pore size after heated, of 10% or less, a good stability of pore size to heating, and yet the product after pleat-form processing has a good filtration accuracy of about 4 to 5 μm.

Whereas, in the case where the content of the lower melting point microfine fibers is less than 20% (Comparative examples 1 and 2), it is seen that by heating, mesh-openings are enlarged, the maximum pore size increases, and the filtration accuracy is also inferior. Further, it is seen that the product having 100% of lower melting point microfine fibers (Comparative example 3) has a good filtration accuracy, but has an inferior degree of permeation and pressure loss.

Example 4

The microfine web obtained according to mixed fiber type melt-blow process, in Example 2 was treated at 140° C. by means of a through-air type heater, to obtain a non-woven fabric having the intersections of fibers hot-melt-adhered and having a basis weight of 98 g/m$^2$.

On the other hand, using a sheath and core type filament composed of a high density polyethylene of m.p. of 133° C. as a sheath component and polypropylene as a core component, and consisting of multifilaments having a single fiber fineness of 6 d/f and 60 filaments, a plain-woven fabric of 3 warps and 3 wefts/25 mm was woven, followed by heating the fabric at 135° C. by means of a tenter type heating machine to obtain a net having the intersections of fiber hot-melt-adhered.

The above non-woven fabric and the above net were laminated into a three layers form of net/non-woven fabric/net, followed by treating the laminate at 120° C. by means of a calender roll to obtain a filtering medium having the net hot-melt-adhered onto the net.

This filtering medium was subjected to pleat form processing in the same manner as in Example 1, followed by processing the resulting material into a cylindrical filtering medium. The surface area of this filtering medium increased by about 9.1 times, as compared with a product having an outer diameter of 70 mm but having no pleat-form. As seen from Table 1, the filtering medium had a percentage of change in a maximum pore size after heated, of 0% and a good stability of the pore size, and the product after processed into pleat form had a good filtration accuracy of 1.1 µm.

Example 5

The filtering medium having the non-woven fabric hot-melt-adhered onto the net, obtained in Example 2 was placed directly on an earthed electrode, followed by treating the medium in a high electric field having a direct current of 14 KV/cm impressed therein, from a discharge electrode positioned above the above-mentioned electrode, to obtain a filtering medium made into an electret. A piece of 30 cm×30 cm size cut off from the filtering medium was placed on a table in an office frequented by many visitors, and floating dusts were naturally adsorbed onto the filtering medium. After 60 days, the condition of contamination on the surface of the filtering medium was judged by a grey scale for contamination specified in JIS-L0805 (evaluation class 1: much contamination; evaluation class 5: small contamination). As a result, the contamination belonged to evaluation class 2.5. On the other hand, the condition of contamination of the filtering material not made into an electret, obtained in Example 2 sas observed at the same time. As a result, the contamination belonged to evaluation class 4.5.

Example 6

A high density polyethylene of an MFR 43 (g/10 min., 190° C.) and a m.p. of 133° C. as a first component, and a polyethylene terephthalate of an intrinsic viscosity of 0.60 and a m.p. of 253° C. as a second component, were conjugate-melt-blow-spun through a side-by-side melt-blow spinneret having a pore size of 0.3 mm and 501 holes, to obtain conjugate, lower melting microfine fibers. These components were extruded under spinning conditions (conjugate ratio: 40 (first component)/60 (second component) (ratio by weight), the spinning temperature of the high desnity polyethylene: 260° C. and that of the polyethylene terephthalate: 280° C.). The fibers extruded from the spinning nozzles were blown onto a conveyer net provided with a spouted air-sucking means, while introducing air at 390° C. and under a pressure of 1.5 Kg/cm². The resulting conjugate low melting point microfine fiber web had a basis weight of 40 g/m² and fiber diameter of 4.0 µm.

This web and the web composed of higher melting point microfine fibers consisting of 100% polypropylene, and having a basis weight of 101 g/m² and a fiber diameter of 3.3 µm, obtained in the above Comparative example 1, were laminated, followed by water-needle treatment under a condition of a pressure of 70 Kg/cm²G. The resulting nonwoven fabric wad dried at 80° C. followed by heat-treating it at 145° C. for 20 seconds by means of a through-air type heater, and just thereafter, treating at 30° C. by means of a calender roll, to obtain a non-woven fabric having the intersections of fibers hot-melt-adhered.

This non-woven fabric and the net used in Example 1 were laminated in the order of net/non-woven fabric/net, followed by treating the resulting laminate at 120° C. by means of a calender roll, to obtain a filtering medium having a non-woven fabric hot-melt-adhered onto a net.

This filtering medium was subjected to pleat-form processing in the same manner as in Example 1, followed by processing the resulting material into a cylindrical filtering medium. The surface area of this filtering medium increased by about 9.1 times, as compared with a product having an outer diameter of 70 mm, but no pleat form.

This filtering medium had a tensile strength before heating, of 46.3 Kg/5 cm and a maximum pore size of 26 µm. After heated at 80° C. for 10 min., the medium had a maximum pore size of 27 µm, a percentage of change in the maximum pore size of 3.9% and a degree of air permeation of 18.8 cc/cm². Further, a product after pleat-form-processed had a filtration accuracy of 3 µm and a pressure loss of 0.04 Kg/cm².

Example 7

Mixed fiber spinning was carried out according to melt-blow spinning process, using two extruders and a spinneret for melt-blowing containing single component holes and conjugate component holes (nozzle diameter: 0.3 mm), composed of 167 holes for lower melting, single component, 167 holes of conjugate component (side by side type) of lower melting component and higher melting component and 167 holes for higher melting component. A linear, low density polyethylene same as used in Example 1 was used as the lower melting component and polypropylene same as used in Example 1 was used as the higher lowering component. As to the spinning conditions, the spinning temperature of the lower melting component was 245° C. and that of the higher melting component was 260° C., and these components were extruded in a composite ratio of the lower melting component and the higher melting component, of 1:1 (% by weight). The lower melting point (single component) microfine fibers, lower melting point (conjugate component) microfine fibers and higher melting point (a single component) microfine fibers were extruded in a ratio of 1:1:1 (% by weight). The resulting fibers extruded from spinning holes were blown onto a conveyer net same as used in Example 1, while introducing air at 330° C. and under a pressure of 1.2 Kg/cm²G. The fiber diameter of the resulting microfine fibers was about 4 µm. The lower melting point (single component) microfine fibers had a diameter of 3.6 µm, the lower melting point (conjugate component) microfine fibers had that of 4.5 µm and the higher melting point (single component) microfine fibers had that of 3.7 µm.

The resulting web was heated at 145° C. for 30 seconds by means of the same heater as in Example 1 to obtain a non-woven fabric having the intersections of fibers hot-melt-adhered and having a basis weight of about 100 g/m².

This non-woven fabric and the same net as in Example 1 were laminated into three layers in the order of net/non-woven fabric/net, followed by heating the laminate at 135° C. for 15 seconds by means of a through-air type heater, and just thereafter treating by means of a calender roll at 30° C., to obtain a filtering medium having the non-woven fabric hot-melt-adhered onto the net.

The filtering medium was subjected to pleat-form processing in the same manner as in Example 1, followed by adhering a metal and surface-sealing member, to obtain a cylindrical, filtering medium. The surface area of this medium increased by about 9.1 times as compared with a product having an outer diameter of 70 mm, but having no pleat form.

This filtering medium before heating had a tensile strength of 31.8 Kg/5 cm and a maximum pore size of 40 μm. Further, the medium after heated at 80° C. for 10 min. had a maximum pore size of 41 μm, a percentage of change in the pore size of 2.5% and a degree of air permeation of 30 cc/cm²sec. Further, the product after pleat-form processing had a filtration accuracy of 5.2 μm and a pressure loss of 0.04 Kg/cm².

The filtering medium had a thicker fiber diameter than those of Comparative examples 1 and 2, but a good filtration accuracy and a good percentage of change in the maximum pore size after heated, of 10% or less.

TABLE 1

| No. | Mixed fiber ratio (wt. %) First fiber | Mixed fiber ratio (wt. %) Second fiber | Basis weight g/m² | Fiber diameter (μm) First fiber | Fiber diameter (μm) Second fiber | Filtering medium (before heating) Tensile strength | Filtering medium (before heating) Maximum pore diameter | Filtering medium (after heated) Maximum pore diameter | Filtering medium (after heated) Percentage of change | Filtering medium (after heated) Degree of aeration | Filtrability (pleat-formed) Filtration accuracy | Filtrability (pleat-formed) Pressure loss |
|---|---|---|---|---|---|---|---|---|---|---|---|---|
| Comp. ex. 1 | 0 | 100 | 101 | — | 3.3 | 28.5 | 72 | 128 | 43.8 | 73 | 9.2 | 0.01 |
| Comp. ex. 2 | 15 | 85 | 98 | 3.0 | 2.9 | 29.8 | 37 | 50 | 35.1 | 51 | 8.0 | 0.03 |
| Example 1 | 30 | 70 | 99 | 2.7 | 3.0 | 30.6 | 32 | 35 | 9.4 | 38 | 4.8 | 0.04 |
| Example 2 | 50 | 50 | 100 | 3.2 | 3.0 | 32.3 | 35 | 37 | 5.7 | 26 | 4.8 | 0.05 |
| Example 3 | 80 | 20 | 100 | 3.2 | 3.2 | 34.6 | 29 | 29 | 0 | 22 | 4.3 | 0.05 |
| Comp. ex. 3 | 100 | 0 | 99 | 3.0 | — | 36.1 | 30 | 30 | 0 | 10.8 | 3.6 | 0.08 |
| Example 4 | 50 | 50 | 98 | 3.2 | 3.0 | 16.9 | 21 | 21 | 0 | 3.2 | 1.1 | 0.10 |

First fiber: linear low density polyethylene
Second fiber: polypropylene

Effectiveness of the Present Invention

The filtering medium of the present invention is a product obtained by hot-melt-adhering a non-woven fabric having the intersections of microfine fibers hot-melt-adhered onto a hot-melt-adhesive net having a larger fineness. Thus, the filtering medium has a superior tensile strength, a small pressure loss, a superior capability of seizing fine particles of 5 μm or less, a superior filtration accuracy, a high degree of air permeation, a good stability of pore size to heating and no enlarging of mesh-openings due to heating, etc. Further, since the filtering medium has a good stability of pore size to heating, it is possible to carry out filtration in a stabilized, high accuracy, even when heating sterilization, high temperature filtration, etc. are required.

Further, it is possible to fabricate the filtering medium into a pleat form or a projection and depression form and the like. Since the filtering medium subjected to pleat-form processing has a large filtration area, it has an effect of a long filtration life in addition to the above effects.

Further, in the case of a product using a web according to melt-blow process, as the web of the non-woven fabric, no finishing agent such as antistatic agent is attached onto the fibers; hence it is also possible to use it as a filtering medium for precision filtration in the field of foods.

What we claim is:

1. A filtering medium having (i) a non-woven fabric composed of a mixture of 20 to 80% by weight of lower melting point microfine fibers and 80 to 20% by weight of higher melting point microfine fibers having a melting point higher by 10° C. or higher than that of said lower melting point microfine fibers, said higher melting point microfine fibers and said lower melting point microfine fibers having been hot-melt-adhered to one another by melt-adhesion of said lower melting point microfine fibers, hot-melt-adhered onto (ii) a hot-melt-adhesive net, the maximum pore size of the resulting filtering medium being 120 μm or less each of said lower melting point microfine fibers and said higher melting point microfine fibers having a fiber diameter of 20 μm or less, and said hot-melt-adhesive net being composed of hot-melt-adhesive fibers having a fineness of 30 to 4,000 deniers.

2. A filtering medium according to claim 1, wherein said lower melting point microfine fibers have a fiber diameter of 10 μm or less and are composed of single component fibers or components of conjugated fibers;

said higher melting point microfine fibers have a fiber diameter of 10 μm or less and are composed of single component fibers or components of conjugated fibers;

said hot-melt-adhesive net is obtained by knitting or weaving conjugated fibers composed of said lower melting point component and said higher melting point component;

the lower melting point component of said conjugate fibers of the hot-melt-adhesive net and the component of said lower melting point microfine fibers belong to the same kind, and the percentage of change in the maximum pore size after hot-treating is 20% or less.

3. A filtering medium according to claim 2 made into an electret, and having a degree of air permeation of 0.1 to 100 cc/cm².second, and a tensile strength of 2 to 100 Kg/5 cm.

4. A filtering medium according to claim 2, subjected to pleat processing.

5. A filtering medium according to claim 1, subjected to pleat processing.

6. A filtering medium according to claim 5 made into an electret, and having a degree of air permeation of 0.1 to 100 cc/cm².second, and a tensile strength of 2 to 100 Kg/5 cm.

7. A filtering medium according to claim 1 made into an electret, and having a degree of air permeation of 0.1 to 100 cc/cm².second, and a tensile strength of 2 to 100 Kg/5 cm.

8. A process for producing a filtering medium, which comprises the steps of:

spinning a plurality of resins through a spinneret to obtain a web composed of 20 to 80% by weight of lower melting point microfine fibers and 80 to 20% by weight of higher melting point microfine fibers having a melting point higher by 10° C. or higher, than that of said lower melting point microfine fibers, and heat-treating said web to obtain a non-woven fabric having fibers hot-melt-adhered to one another by said lower melting point microfine fibers, each of said lower melting point microfine fibers and said higher melting point microfine fibers having a fiber diameter of 20 μm or less, spinning, in a separate step, a resin through a spinneret to obtain fibers, followed by knitting or weaving the fibers to obtain a hot-melt-adhesive net, said hot-melt-adhesive net being composed of hot-melt-adhesive fibers having a fineness of 30 to 4,000 demiers, and laminating said non-woven fabric onto said hot-melt-adhesive net, and heat-treating the resulting laminate to obtain a filtering medium having a maximum pore size of 120 μm or less.

9. A process for producing a filtering medium according to claim 8, wherein said non-woven fabric is obtained by heat-treating a microfine fiber web obtained by spinning according to melt-blow process.

* * * * *